US012798017B2

(12) United States Patent
Lai et al.

(10) Patent No.: US 12,798,017 B2
(45) Date of Patent: Nov. 17, 2026

(54) PRESSING PLATE STRUCTURE AND WELDING MACHINE

(71) Applicant: CONTEMPORARY AMPEREX TECHNOLOGY (HONG KONG) LIMITED, Hong Kong (CN)

(72) Inventors: Zhonglin Lai, Ningde (CN); Guangcheng Zhong, Ningde (CN); Lei Song, Ningde (CN); Shengdong Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 692 days.

(21) Appl. No.: 18/349,721

(22) Filed: Jul. 10, 2023

(65) Prior Publication Data

US 2024/0157488 A1 May 16, 2024

Related U.S. Application Data

(63) Continuation of application No. PCT/CN2023/084728, filed on Mar. 29, 2023.

(30) Foreign Application Priority Data

Nov. 16, 2022 (CN) ......................... 202223050340.4

(51) Int. Cl.
*B23K 37/04* (2006.01)
*B23K 20/26* (2006.01)

(52) U.S. Cl.
CPC .......... *B23K 37/0426* (2013.01); *B23K 20/26* (2013.01)

(58) Field of Classification Search
CPC ........................... B23K 37/0426; B23K 20/26; B23K 37/0211; B23K 37/02; B23K 9/0216;

(Continued)

(56) References Cited

U.S. PATENT DOCUMENTS

| | | | | |
|---|---|---|---|---|
| 4,400,610 A * | 8/1983 | Murakami | B23Q 15/24 228/9 |
| 4,590,355 A * | 5/1986 | Nomura | B23K 9/073 219/124.22 |
| 2016/0074957 A1* | 3/2016 | Nishida | B23K 20/123 228/114.5 |

FOREIGN PATENT DOCUMENTS

| | | |
|---|---|---|
| CN | 102306826 A | 1/2012 |
| CN | 210937646 U | 7/2020 |

(Continued)

OTHER PUBLICATIONS

The European Patent Office (EPO) The Extended European Search Report for Application No. 23731080.0 Mar. 7, 2025 6 Pages.

(Continued)

*Primary Examiner* — Phuong T Nguyen
(74) *Attorney, Agent, or Firm* — ANOVA LAW GROUP, PLLC

(57) ABSTRACT

A pressing plate structure includes a frame and a pressing block unit. The pressing block unit includes a first crimping portion and a second crimping portion fixedly connected to each other. The first crimping portion is movably disposed on the frame in a first direction to approach or leave an electrode assembly. The second crimping portion protrudes downward from the first crimping portion in the first direction. The second crimping portion is provided with a welding hole extending in the first direction. The second crimping portion is capable of being crimped onto a tab of the electrode assembly, and the welding hole exposes part of the tab.

10 Claims, 7 Drawing Sheets

(58) Field of Classification Search
CPC .... B23K 37/0241; B23K 9/12; B23K 9/0256; B23K 37/0264; B23K 9/025; B23K 37/0282; B23K 37/0294
USPC .................. 219/158, 124.31, 124.34, 125.12
See application file for complete search history.

(56) References Cited

FOREIGN PATENT DOCUMENTS

| | | | | |
|---|---|---|---|---|
| CN | 214350239 U | | 10/2021 | |
| CN | 216958259 U | | 7/2022 | |
| CN | 115041802 A | * | 9/2022 | ............. B23K 20/26 |
| CN | 217507593 U | | 9/2022 | |
| CN | 218695333 U | | 3/2023 | |
| DE | 102015209719 A1 | | 12/2016 | |
| KR | 20130055424 A | | 5/2013 | |
| KR | 20190128351 A | | 11/2019 | |
| WO | 2021218082 A1 | | 11/2021 | |

OTHER PUBLICATIONS

The World Intellectual Property Organization (WIPO) International Search Report for PCT/CN2023/084728 Jul. 19, 2023 8 Pages (including translation).

* cited by examiner

PRESSING PLATE STRUCTURE AND WELDING MACHINE

CROSS-REFERENCE TO RELATED APPLICATIONS

This application is a continuation of International Application No. PCT/CN2023/084728, filed on Mar. 29, 2023, which claims priority to Chinese Patent Application No. 2022230503404 filed on Nov. 16, 2022 and entitled "PRESSING PLATE STRUCTURE AND WELDING MACHINE", which are incorporated herein by reference in their entirety.

TECHNICAL FIELD

This application relates to the field of battery processing, and in particular, to a pressing plate structure and a welding machine.

BACKGROUND

During actual processing of tabs of an electrode assembly, a welding machine is usually required for fixing all copper foil tabs and all aluminum foil tabs by welding, and then subsequent processes are performed to finish the processing of the electrode assembly.

However, the lack of pressing plate structures for electrode assemblies and tabs results in unstable welding quality of tabs.

SUMMARY

In view of the foregoing problem, this application provides a pressing plate structure and a welding machine, so as to improve welding quality of tabs.

According to a first aspect, this application provides a pressing plate structure. The pressing plate structure includes a frame and a pressing block unit, where the pressing block unit includes a first crimping portion and a second crimping portion fixedly connected to each other; the first crimping portion is movably disposed on the frame in a first direction to approach or leave an electrode assembly; the second crimping portion protrudes downward from the first crimping portion in the first direction; the second crimping portion is provided with a welding hole extending in the first direction; and the second crimping portion is capable of being crimped onto a tab of the electrode assembly, and the welding hole exposes part of the tab.

In the pressing plate structure, the first crimping portion and the second crimping portion fixedly connected to each other are provided, where the second crimping portion protrudes downward from the first crimping portion in the first direction, and the first crimping portion is movably disposed on the frame in the first direction to approach or leave the electrode assembly. With a height difference designed between the first crimping portion and the second crimping portion, when the first crimping portion moves downward to a bottommost end along the first direction, the first crimping portion abuts against a side surface of the body of the electrode assembly to prevent the body from shaking during welding, and the second crimping portion can be crimped onto the tab of the electrode assembly, to prevent the tab from shaking during welding. The first crimping portion and the second crimping portion are kept fixed relative to each other without a relative displacement, so as to effectively prevent the second crimping portion being pulled out or inserted from driving the tab to loosen unnecessarily, effectively preventing occurrence of rosin joints and improving the welding quality.

In some embodiments, the first crimping portion includes a first sub-plate, a transition section, and a second sub-plate, where the first sub-plate and the second sub-plate are respectively connected to a left side and a right side of the transition section, and the transition section is shorter than the first sub-plate, so as to form a notch; and at least part of the second crimping portion is disposed in the notch.

In some embodiments, the second crimping portion includes a fixing block and a crimping block, where the fixing block is detachably connected to the transition section; the crimping block is located in the notch; and the welding hole runs through the crimping block in the first direction.

In some embodiments, a bottom surface of the crimping block facing the tab is provided with a protruding rib.

In some embodiments, the protruding rib is arranged around the welding hole.

In some embodiments, a first shaping section is formed at a junction between a first side surface of the crimping block close to the first sub-plate and the bottom surface of the crimping block facing the tab; and/or a second shaping section is formed at a junction between a second side surface of the crimping block close to the second sub-plate and the bottom surface of the crimping block facing the tab.

In some embodiments, the pressing plate structure includes a drive mechanism, where the drive mechanism is fixed to the frame; and the drive mechanism is in transmission connection with the first crimping portion, so as to drive the first crimping portion to movably approach or leave the electrode assembly along the first direction.

In some embodiments, the pressing block unit includes a connecting plate, where the connecting plate is connected to the drive mechanism, and the connecting plate is connected to a surface of the first crimping portion facing away from the electrode assembly.

In some embodiments, the first crimping portion and the second crimping portion are integrally connected.

According to a second aspect, this application provides a welding machine including the foregoing pressing plate structure.

The foregoing description is merely an overview of the technical solutions of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art will be clear about various other advantages and benefits by reading the detailed description of the embodiments below. The accompanying drawings are merely intended to illustrate some embodiments and are not intended to limit this application. In addition, throughout the accompanying drawings, the same reference signs represent the same components. In the accompanying drawings.

Figure 1:
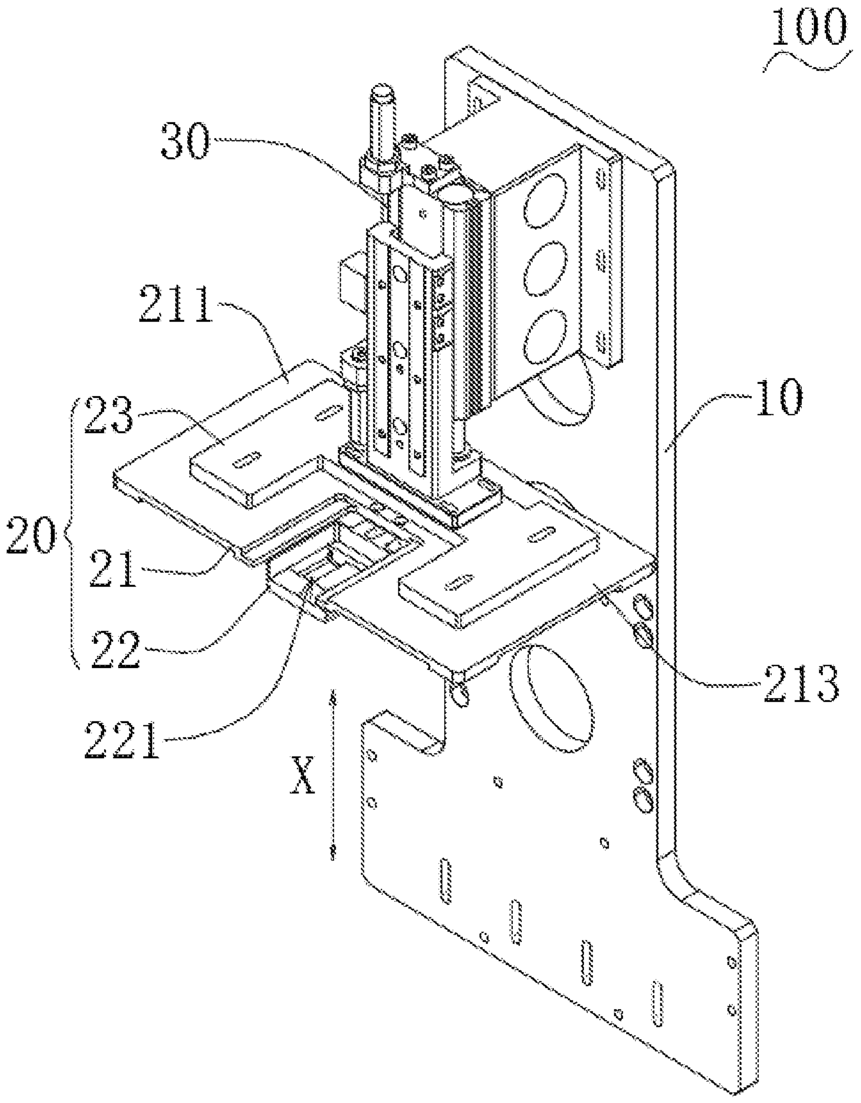
FIG. 1 is a three-dimensional schematic diagram of a pressing plate structure according to an embodiment of this application.

Direction X in each accompanying drawing is a first direction in the embodiments of this application.

Reference signs in specific embodiments are as follows: pressing plate structure 100; frame 10; pressing block unit 20; first crimping portion 21; first sub-plate 211; transition section 212; second sub-plate 213; notch 214; process groove 215; second crimping portion 22; welding hole 221; fixing block 222; process hole 2221; crimping block 223; protruding rib 224; first side surface 225; bottom surface 226; first shaping section 227; second side surface 228; second shaping section 229; connecting plate 23; drive mechanism 30; first limiting mechanism 31; second limiting mechanism 32; welding head 200; welding base 210; electrode assembly positioning groove 300; electrode assembly 900; body 910; and tab 920.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application belongs. The terms used herein are intended to merely describe the specific embodiments rather than to limit this application. The terms "include", "comprise", and any other variations thereof in the specification, claims and brief description of accompanying drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, particular sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is merely for describing an associative relationship of associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of market development, application of traction batteries is becoming more and more extensive. Traction batteries have been widely used in energy storage power supply systems such as hydroelectric power plants, thermal power plants, wind power plants, and solar power plants, as well as in many other fields including electric transportation tools such as electric bicycles, electric motorcycles, and electric vehicles, and aerospace. With continuous expansion of application fields of traction batteries, market demands for the traction batteries are also expanding.

A traction battery typically includes one or more battery cells. Each battery cell may be a secondary battery or a primary battery, and may be a lithium-sulfur battery, a sodium-ion battery, or a magnesium-ion battery, without being limited thereto.

A battery cell typically includes one or more electrode assemblies 900 and other functional components, where the electrode assembly 900 is a component in which electrochemical reactions take place in the battery cell. The electrode assembly 900 is mainly formed by winding or stacking a positive electrode plate and a negative electrode plate, and typically a separator is provided between the positive-electrode plate and the negative-electrode plate. Parts of the positive electrode plate and negative electrode plate with active substances constitute a body 910 of the electrode assembly 900, while parts of the positive electrode plate and negative electrode plate with no active substances each constitute a tab 920.

During processing and manufacturing of the electrode assembly 900, a part extending out of the negative electrode plate and having no active substance may be a copper foil or a copper-plated nickel foil extending in a strip shape, and a plurality of copper foil or copper-plated nickel foil layers are compacted and then welded to form a negative electrode tab. Similarly, a part extending out of the positive electrode plate and having no active substance may be an aluminum foil extending in a strip shape, and a plurality of aluminum foil layers are compacted and then welded to form a positive electrode tab.

The positive electrode tab and the negative electrode tab may both be located at one end of the body 910 or may be located at two ends of the main body respectively. During charge and discharge of the battery, a positive electrode active substance and a negative electrode active substance react with an electrolyte, and the tab 920 can be connected to an external electrode terminal to form a current loop.

The inventors have noted that in the related art, the electrode assembly 900 includes the body 910 and the tab 920; due to a winding-based manufacturing method, the body 910 is usually flat; a side portion of the body 910 is a large cell surface 912 with a large area; and a plurality of strip material layers capable of forming the tab 920 extend out of an end surface of the body 910. Before a process of welding the tab 920, the plurality of strip material layers are a loose structure. During welding, generally one pressing plate is crimped onto the large cell surface 912, leaving a corresponding empty groove, while another pressing plate independently moves into the empty groove from outside and is crimped onto the tab 920 for welding. The two pressing plates are not positioned, and displacement deviations thereof in the vertical direction lead to loosening of crimps applied by the two pressing plates to the body 910 and the tab 920. In addition, in the process of moving the pressing plate into the empty groove from outside and moving the pressing plate out of the empty groove after welding, unnecessary relative displacement of the tab 920 with respect to the body 910 may occur, leading to shaking of the plurality of strip material layers and thus resulting in occurrence of rosin joint.

To alleviate the problem of rosin joint caused by positioning deviation, the applicants have found through research that if there is no relative displacement between the two pressing plates, a distance from the tab 920 to the body 910 can be designed to allow the two pressing plates to respectively press the tab 920 and the body 910 simultaneously, so that both the body 910 and the tab 920 can be pressed during welding, thereby preventing loosening of the tab 920 and the body 910.

Based on the above considerations, to improve the welding quality of the tab 920, the inventors have designed a pressing plate structure through in-depth research, where a first crimping portion 21 and a second crimping portion 22 are fixedly connected; the second crimping portion 22 protrudes downward from the first crimping portion 21 in the first direction; the first crimping portion 21 is movably disposed on the frame 10 in the first direction; when the first crimping portion 21 moves downward to the bottommost end along the first direction, the first crimping portion 21 abuts against the large cell surface 912 of the body 910 of the electrode assembly 900 to prevent the body 910 from shaking during welding; and the second crimping portion 22 can be crimped on the tab 920 of the electrode assembly 900 to prevent the tab 920 from shaking during welding, effectively preventing occurrence of rosin joint and improving the welding quality.

The pressing plate structure and welding machine disclosed in the embodiments of this application can be used for, but are not limited to, welding of primary batteries or secondary batteries.

Figure 2:
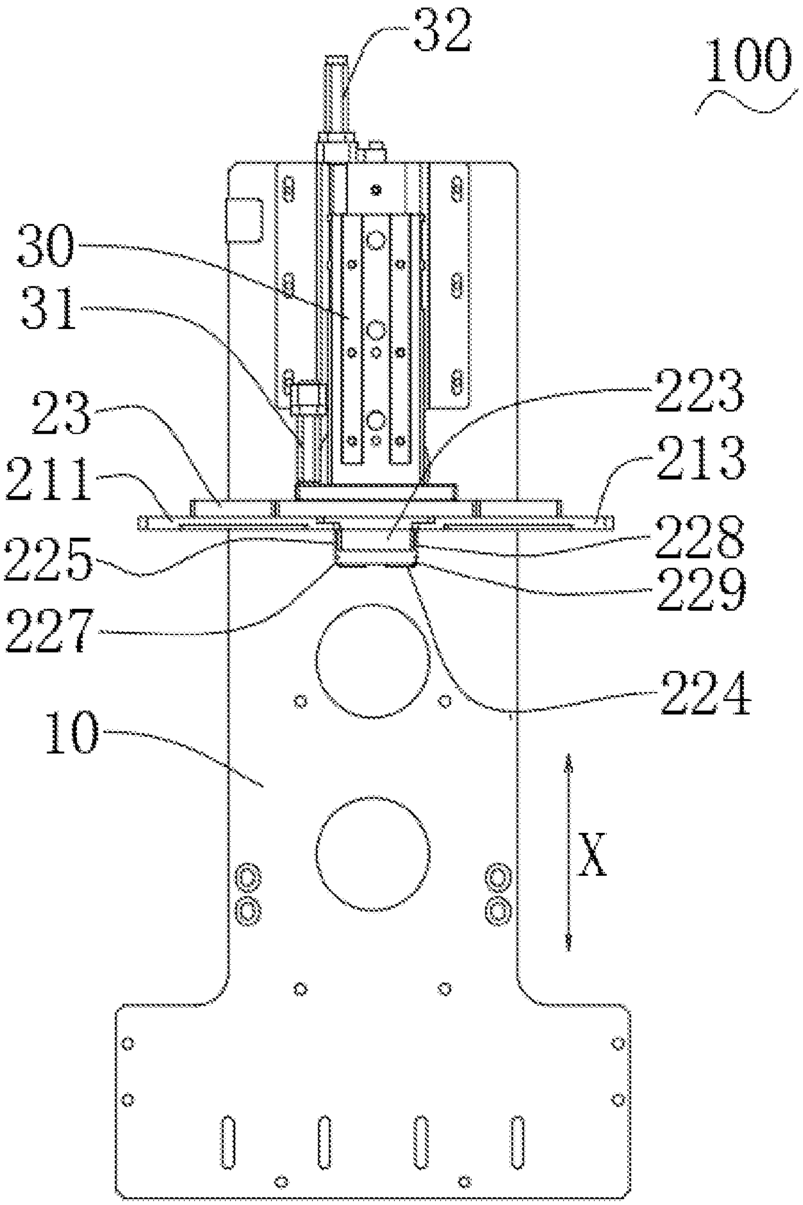
FIG. 2 is a front view of a pressing plate structure according to an embodiment of this application.
Figure 3:
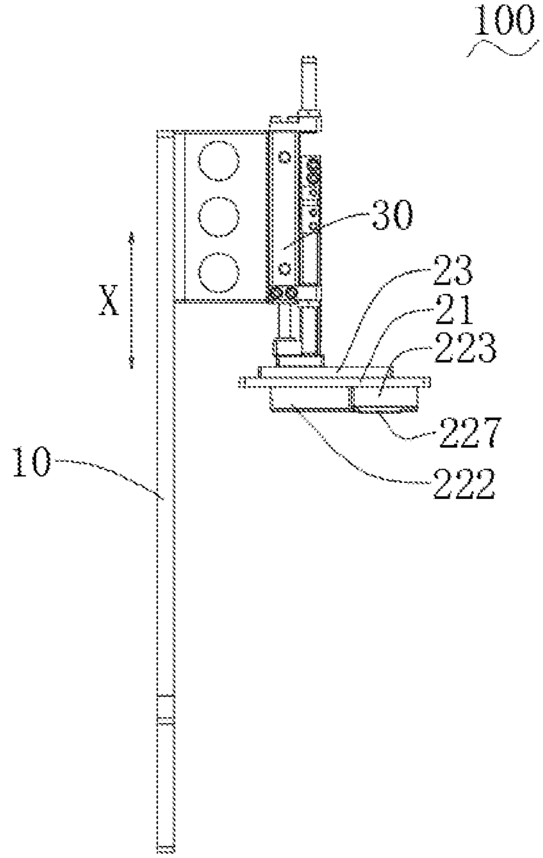
FIG. 3 is a side view of a pressing plate structure according to an embodiment of this application.
Figure 4:
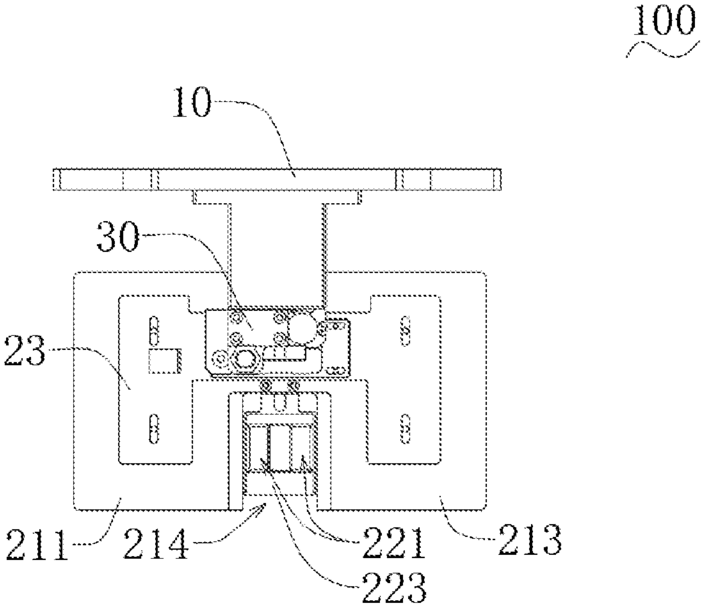
FIG. 4 is a top view of a pressing plate structure according to an embodiment of this application.
Figure 5:
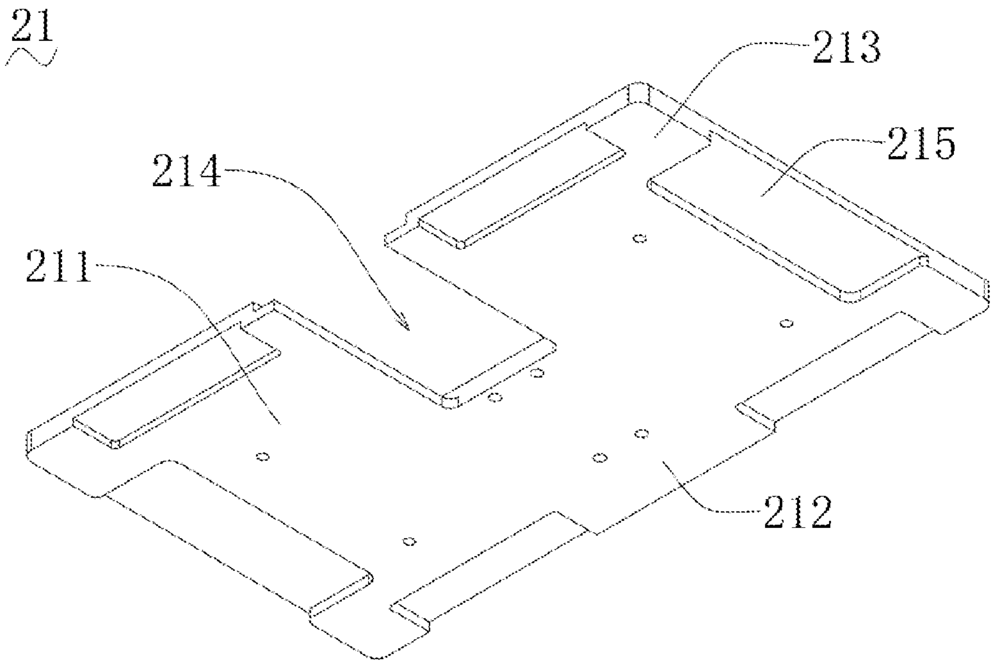
FIG. 5 is a schematic structural diagram of a first crimping portion according to an embodiment of this application.
Figure 6:
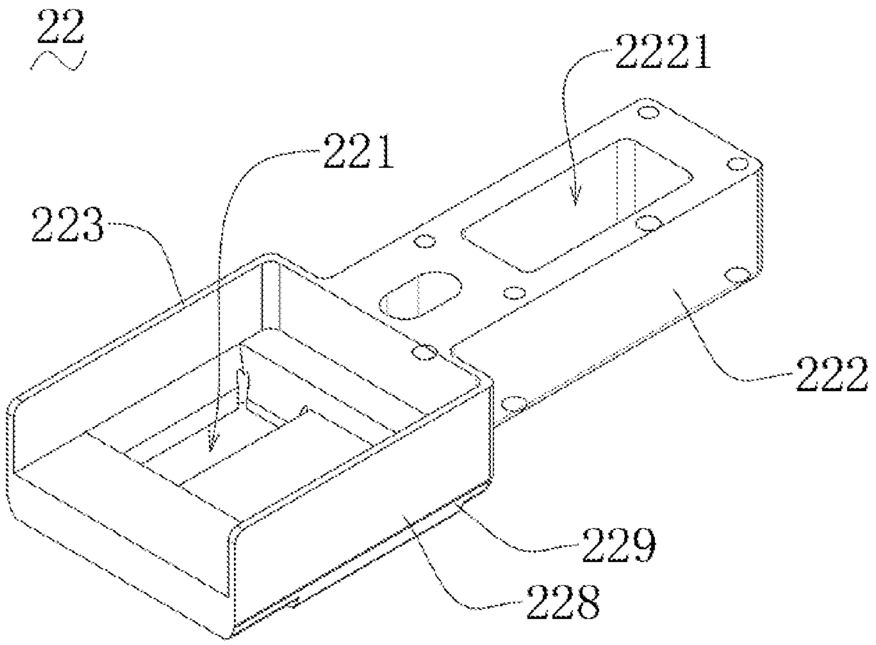
FIG. 6 is a schematic structural diagram of a second crimping portion from a first perspective according to an embodiment of this application.
Figure 7:
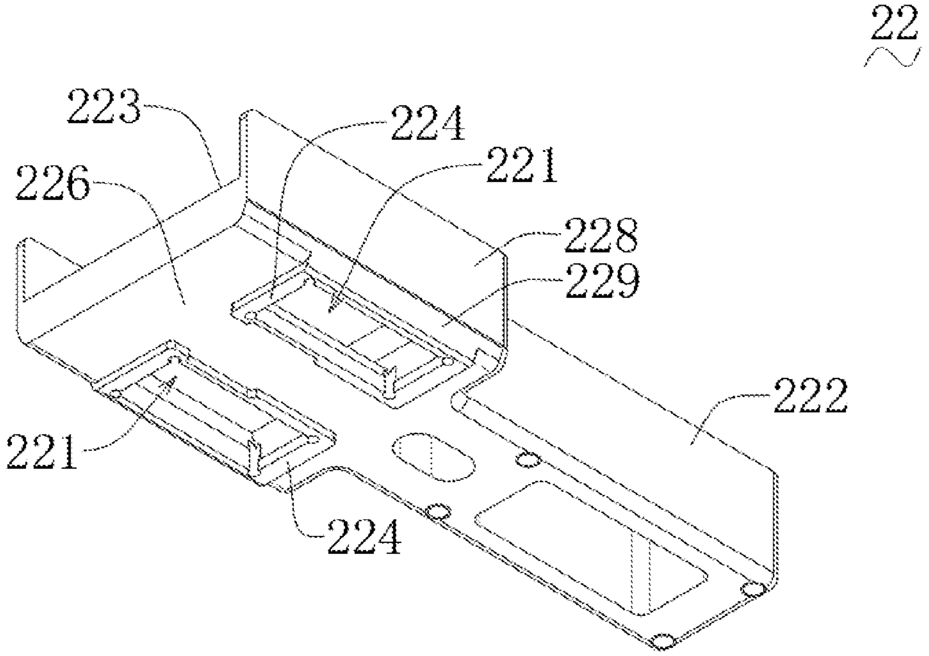
FIG. 7 is a schematic structural diagram of a second crimping portion from a second perspective according to an embodiment of this application.
Figure 8:
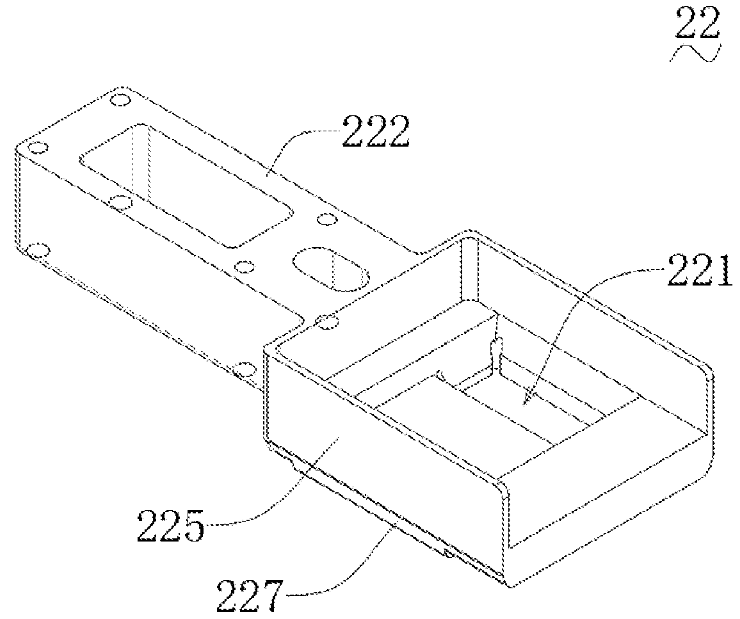
FIG. 8 is a schematic structural diagram of a second crimping portion from a third perspective according to an embodiment of this application.
Figure 9:
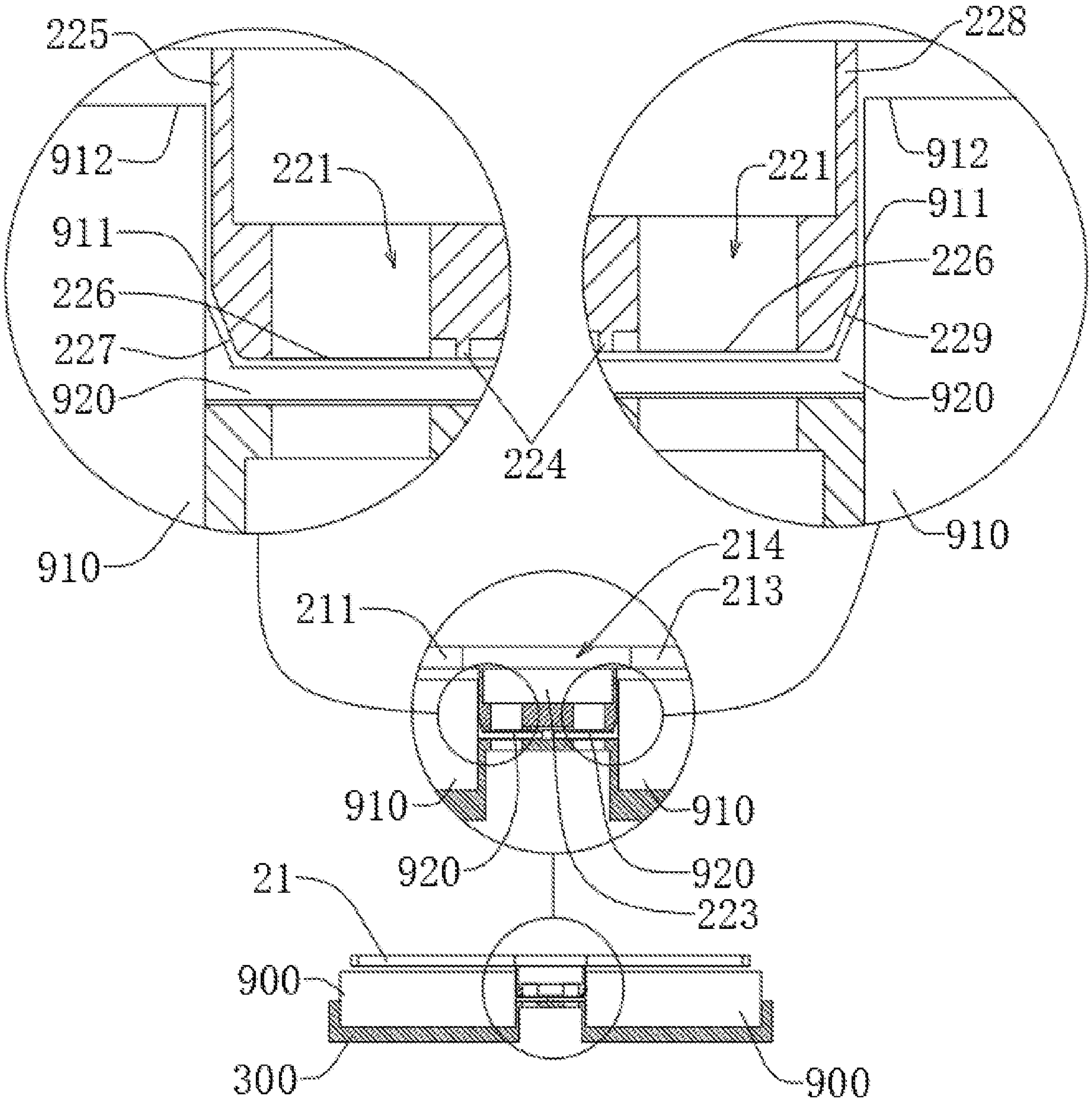
FIG. 9 is a schematic diagram showing an assembly relationship between a pressing plate structure, an electrode assembly, and an electrode assembly positioning groove according to an embodiment of this application.

According to some embodiments of this application, referring to FIG. 1 and further referring to FIG. 2 to FIG. 9, FIG. 1 is a three-dimensional schematic diagram of a pressing plate structure according to some embodiments of this application; FIG. 2 to FIG. 4 are structural schematic diagrams of a pressing plate structure from different perspectives according to some embodiments of this application; FIG. 5 is a schematic structural diagram of a first crimping portion according to some embodiments of this application; FIG. 6 to FIG. 8 are structural schematic diagrams of a second crimping portion from different perspectives according to some embodiments of this application; and FIG. 9 is a schematic diagram showing an assembly relationship between a pressing plate structure, an electrode assembly, and an electrode assembly positioning groove.

According to a first aspect, this application provides a pressing plate structure 100 configured for welding an electrode assembly 900.

The electrode assembly 900 includes a body 910 and a tab 920 extending out of an end surface 911 of the body 910. It can be understood that the tab 920 is a multi-layer strip-shaped loose material before welding; and after welding, the material layers of the tab 920 are closely connected as a whole and can be connected to an external electrode terminal to form a current loop.

The pressing plate structure 100 includes a frame 10 and a pressing block unit 20.

The pressing block unit 20 includes a first crimping portion 21 and a second crimping portion 22 fixedly connected to each other.

The second crimping portion 22 protrudes downward from the first crimping portion 21 in a first direction. In other words, the second crimping portion 22 is located at a lower position with respect to a bottom surface of the first crimping portion 21 facing the electrode assembly 900, and entirely protrudes out of the bottom surface of the first crimping portion 21.

The first crimping portion 21 is movably disposed on the frame 10 in the first direction to approach or leave the electrode assembly 900. The first crimping portion 21 abuts against a side surface of the body 910 of the electrode assembly 900, and the second crimping portion 22 can be crimped onto the tab 920 of the electrode assembly 900.

Specifically, with reference to the orientations shown in FIG. 1 and as shown in FIG. 9, with a height difference designed between the first crimping portion 21 and the second crimping portion 22, when the first crimping portion 21 moves downward to a bottommost end along the first direction, the first crimping portion 21 abuts against a large cell surface 912 of the body 910 of the electrode assembly 900 to prevent the body 910 from shaking during welding; the second crimping portion 22 can be crimped onto the tab 920 of the electrode assembly 900, to prevent the tab 920 from shaking during welding; the first crimping portion 21 and the second crimping portion 22 are fixedly connected so that the first crimping portion 21 and the second crimping portion 22 are kept fixed relative to each other without a relative displacement; and the pressing block unit 20 is entirely crimped onto the electrode assembly 900, so that pulling out and insertion of the second crimping portion 22 are avoided during welding. In this way, the welding operation is simplified, a simplified structure is achieved, and use of a redundant operating structure in the related art is avoided. In addition, the second crimping portion 22 can be effectively prevented from driving the tab 920 to unnecessarily loosen while being pulled out or inserted, effectively preventing occurrence of rosin joints and improving the welding quality. The second crimping portion 22 is provided with a welding hole 221 extending in the first direction. When the second crimping portion 22 is crimped onto the tab 920 of the electrode assembly 900, part of the tab 920 is tightly pressed by a peripheral structure of the welding hole 221, and the welding hole 221 exposes part of the tab 920, such that a welding head 200 (mentioned hereinafter) conveniently passes through the welding hole 221 to weld the tab 920 exposed in the welding hole 221, thereby ensuring that the tab 920 is welded at a same site every time, improving the consistency of welding.

In some embodiments, the first crimping portion 21 and the second crimping portion 22 can be integrally processed and formed, with high structural strength and a high-precision height difference therebetween. Certainly, in some other embodiments, the first crimping portion 21 and the second crimping portion 22 can be separately processed and then connected using bolts or directly welded, with a simple process and a low cost.

In some embodiments, as shown in FIG. 7, the second crimping portion 22 is provided with two welding holes 221, and the two welding holes 221 are arranged side by side. Typically, the body 910 of one electrode assembly 900 includes two groups of tabs 920, where one group of tabs 920 are positive electrode tabs, and the other group of tabs 920 are negative electrode tabs. One battery cell may include two electrode assemblies 900; the positive electrode tabs of the two electrode assemblies 900 are connected using an adapting piece (not marked); the negative electrode tabs of the two electrode assemblies 900 are connected using another adapting piece; and two welding holes 221 are arranged side by side so as to expose the positive electrode tabs of both the two electrode assemblies 900 or expose the negative electrode tabs of both the two electrode assemblies 900, so that the tabs 920 of the two electrode assemblies 900 can be welded in one welding process, improving the welding efficiency. Certainly, in some other embodiments, the second crimping portion 22 may be provided with one, three, or more welding holes 221. This is not limited in the embodiments of this application.

In some embodiments, as shown in FIG. 7, a cross section of the welding hole 221 is rectangular. In some other embodiments, the cross section of the welding hole 221 may be circular, elliptic, triangular, or the like.

It can be understood that in the embodiments of this application, with reference to the orientations shown in FIG. 1, direction X is the first direction, which is typically the vertical direction. In some other embodiments, the first direction may be another direction. This is not limited in this application.

In some embodiments, as shown in FIG. 1 to FIG. 5, FIG. 9, and FIG. 10, the first crimping portion 21 includes a first sub-plate 211, a transition section 212, and a second sub-plate 213.

The first sub-plate 211 and the second sub-plate 213 can be integrally connected via the transition section 212. The first sub-plate 211 and the second sub-plate 213 are typically the same in length, width, thickness and shape and are symmetrically designed. However, in some other embodiments, the first sub-plate 211 and the second sub-plate 213 may also be different in length, width, thickness and shape. This is not limited in the embodiments of this application.

The first sub-plate 211 and the second sub-plate 213 are respectively connected to a left side and a right side of the transition section 212, the transition section 212 is shorter than the first sub-plate 211, and the transition section 212 is shorter than the second sub-plate 213. In this way, a notch 214 can be formed between the first sub-plate 211 and the second sub-plate 213. The notch 214 is typically in a U shape, or may be designed in a semicircular shape or other shapes as required.

At least part of the second crimping portion 22 is disposed in the notch 214.

Specifically, when the first crimping portion 21 abuts against the electrode assembly 900, the first sub-plate 211 and the second sub-plate 213 are crimped onto the large cell surfaces 912 of the bodies 910 of two electrode assemblies 900, respectively, so as to prevent the bodies 910 from shaking during welding. A position facing the notch 214 is just over the tabs 920 of the two electrode assemblies 900. In this way, the second crimping portion 22 can be crimped onto the tabs 920 of both the two electrode assemblies 900, and the welding head 200 can pass through the notch 214 and the welding hole 221 in sequence to weld the tab 920.

In some embodiments, the first crimping portion 21 is typically an aluminum plate, a carbon steel plate, or a stainless steel plate. As shown in FIG. 5, a process groove 215 is formed on the bottom surface of the first crimping portion 21 and is configured to fit with other structures, thereby preventing interference and reducing weight.

In some embodiments, as shown in FIG. 1 to FIG. 4 and FIG. 6 to FIG. 9, the second crimping portion 22 includes a fixing block 222 and a crimping block 223.

The fixing block 222 is detachably connected to the transition section 212.

Bottom surfaces of the first sub-plate 211, second sub-plate 213 and transition section 212 are typically at a same horizontal level, and the fixing block 222 is fixed to the bottom surface of the transition section 212 facing the electrode assembly 900. In this way, with the bottom of the transition section 212 as an original point, the fixing block 222 can protrude downward a specified distance in the first direction, and that distance can be determined by designing thickness of the fixing block 222, achieving good manufacturability. The fixing block 222 and the transition section 212 are connected using a bolt, facilitating disassembly and maintenance.

When the first crimping portion 21 abuts against the electrode assembly 900, the first sub-plate 211 and the second sub-plate 213 are crimped onto the large cell surfaces 912 of the bodies 910 of two electrode assemblies 900, respectively; a position facing the notch 214 is just over the tabs 920 of the two electrode assemblies 900; the fixing block 222 is detachably connected to the transition section 212; the crimping block 223 is located in the notch 214; the welding hole 221 runs through the crimping block 223 in the first direction; and there may be two welding holes 221 on the crimping block 223 to correspond to the two electrode assemblies 900. In this way, the crimping block 223 can be crimped onto the tabs 920 of the two electrode assemblies 900, and the welding head 200 can pass through the notch 214 and the welding hole 221 in sequence to weld the tab 920.

In some possible embodiments, the fixing block 222 and the crimping block 223 are integrally connected and may be integrally processed using stainless steel or aluminum, with good connection strength and a small size deviation therebetween. In some other embodiments, the fixing block 222 and the crimping block 223 are separately processed and then fixedly connected by welding or using bolts.

In some embodiments, as shown in FIG. 6, the fixing block 222 is provided with a plurality of process holes 2221. Without affecting the structural strength, weight of the second crimping portion 22 is reduced as far as possible, thereby reducing weight of the overall welding machine.

In some embodiments, as shown in FIG. 7 and FIG. 9, the bottom surface 226 of the crimping block 223 facing the tab 920 is provided with a protruding rib 224.

When the first crimping portion 21 abuts against the electrode assembly 900, the first sub-plate 211 and the second sub-plate 213 are crimped onto the large cell surfaces 912 of the bodies 910 of two electrode assemblies 900, respectively; a position facing the notch 214 is just over the tabs 920 of the two electrode assemblies 900; the crimping block 223 is located in the notch 214; the crimping block 223 is crimped onto the tab 920 of the electrode assembly 900; with the protruding rib 224 formed on the bottom surface 226 of the crimping block 223 facing the tab 920, a contact area between the crimping block 223 and the tab 920 can be effectively reduced, so that intensity of pressure per unit area under the same crimping force is enhanced, making the crimping block 223 be crimped onto the tab 920 more stably and preventing the crimping block 223 from loosening; the welding hole 221 runs through the crimping block 223 in the first direction; and the welding head 200 can pass through the notch 214 and the welding hole 221 in sequence to weld the tab 920, preventing occurrence of rosin joint and improving the welding quality.

In some embodiments, as shown in FIG. 7, the protruding rib 224 is disposed around the welding hole 221, so that a peripheral region of the welding hole 221 is crimped onto the tab 920 more stably, thereby avoiding loosening.

In some other embodiments, a plurality of protruding ribs 224 may be arranged linearly. This is not limited in the embodiments of this application.

In some embodiments, as shown in FIG. 2 and FIG. 9, a first shaping section 227 is formed at a junction between a first side surface 225 of the crimping block 223 close to the first sub-plate 211 and the bottom surface 226 of the crimping block 223 facing the tab 920. A second shaping section 229 is formed at a junction between a second side surface 228 of the crimping block 223 close to the second sub-plate 213 and the bottom surface 226 of the crimping block 223 facing the tab 920.

The first shaping section 227 and the second shaping section 229 may be inclined surfaces or smooth arc surfaces.

When the first crimping portion 21 abuts against the electrode assembly 900, the first sub-plate 211 and the second sub-plate 213 are crimped onto the large cell surfaces 912 of the bodies 910 of two electrode assemblies 900, respectively; the crimping block 223 is crimped onto the tabs 920 of the two electrode assemblies 900; and the first shaping section 227 and the second shaping section 229 move downward along the first direction until abutting against root regions of the tabs 920 and the bodies 910. It should be understood that the tab 920 is a loose multi-layer structure before welding, relatively many gaps are present in a root portion of the tab 920, and the root portion is difficult to compact by the bottom surface 226 of the crimping block 223, so that voids are prone to occur. However, if the first side surface 225 and the bottom surface 226 form a sharp right-angled structure therebetween, and the second side surface 228 and the bottom surface 226 form a sharp right-angled structure therebetween, the two right-angled structures directly squeeze the tab 920 of a multi-layer structure, resulting in cracking of an outermost layer of the tab 920. With provision of the first shaping section 227 and the second shaping section 229, a smooth arc surface or a transition inclined surface is formed, thus a shaping function is provided, which not only avoids formation of the voids in the tab 920, but also prevents cracking of the tab 920 during welding, effectively improving the welding quality.

In some embodiments, as shown in FIG. 1 to FIG. 4 and FIG. 10, the pressing plate structure includes a drive mechanism 30.

The drive mechanism 30 is fixed to the frame 10, and the drive mechanism 30 is in transmission connection with the first crimping portion 21 so as to drive the first crimping portion 21 to movably approach or leave the electrode assembly 900 along the first direction.

The drive mechanism 30 is a cylinder or a motor.

In an example in which the drive mechanism 30 is a cylinder, an acting shaft (not marked) of the drive mechanism 30 may be provided with a first limiting mechanism 31 and a second limiting mechanism 32 in the first direction. As shown in FIG. 2, the first limiting mechanism 31 and the second limiting mechanism 32 may be two baffle plates arranged in the first direction for limiting an action length of the drive mechanism 30.

Specifically, the drive mechanism 30 drives the first crimping portion 21 to move downward along the first direction until the acting shaft of the drive mechanism 30 is limited by the first limiting mechanism 31. At that point, the first crimping portion 21 abuts against the electrode assembly 900, the first sub-plate 211 and the second sub-plate 213 are crimped onto the large cell surfaces 912 of the bodies 910 of the two electrode assemblies 900, respectively, the crimping block 223 is crimped onto the tabs 920 of the two electrode assemblies 900, and the welding head 200 can pass through the notch 214 and the welding hole 221 in sequence to weld the tabs 920. The downward movement along the first direction herein means that the first crimping portion 21 approaches the electrode assembly 900.

After welding, the drive mechanism 30 drives the first crimping portion 21 to move upward along the first direction until the acting shaft of the drive mechanism 30 is limited by the second limiting mechanism 32. At that point, the first sub-plate 211 and the second sub-plate 213 both leave the large cell surfaces 912 of the bodies 910 of the two electrode assemblies 920, and the crimping block 223 also leaves the tabs 900 of the two electrode assemblies 900, such that the welded electrode assemblies 900 are conveniently moved away for a subsequent procedure, thereby leaving space for placing another electrode assembly 900 to be welded.

In some embodiments, the first limiting mechanism 31 and the second limiting mechanism 32 may be magnetic inductors. Air regulation valves (not marked) may be connected in series in an air inlet chamber of the drive mechanism 30. When the first limiting mechanism 31 and the second limiting mechanism 32 sense that the drive mechanism 30 has moved to a corresponding position, a command is sent to the air regulation valves to enable or disable air input by the drive mechanism 30, such that the drive mechanism 30 drives the first crimping portion 21 to movably approach or leave the electrode assembly 900 along the first direction.

In some embodiments, as shown in FIG. 1 to FIG. 4, the pressing block unit 20 includes a connecting plate 23, where the connecting plate 23 is connected to the drive mechanism 30, and the connecting plate 23 is connected to a surface of the first crimping portion 21 facing away from the electrode assembly 900.

The acting shaft of the drive mechanism 30 is connected to a middle portion of the connecting plate 23; the middle portion of the connecting plate 23 is fixed to the transition section 212; and two sides of the connecting plate 23 extend to the first sub-plate 211 and the second sub-plate 213 respectively, thereby ensuring that no deflection occurs when the drive mechanism 30 is driving the first crimping portion 21, and ensuring a crimping effect of the pressing block unit 20 on the electrode assembly 900. Thus, situation such as occurrence of rosin joint is avoided, and the welding quality is improved.

The connecting plate 23 and the first sub-plate 211, as well as the connecting plate 23 and the second sub-plate 213 can be connected using a bolt or by welding.

According to a second aspect, this application provides a welding machine including the foregoing pressing plate structure 100.

Figure 10:
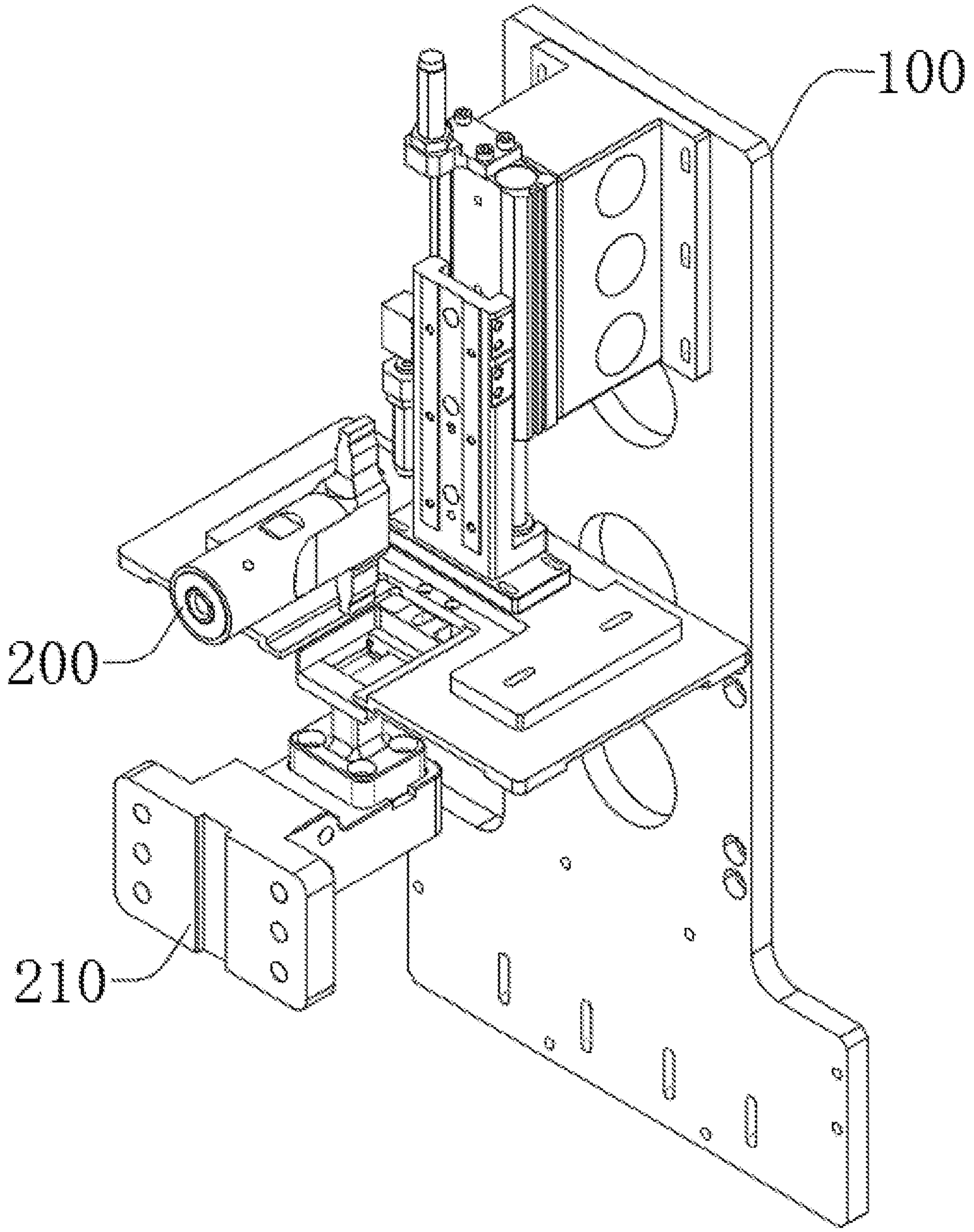
FIG. 10 is a schematic structural diagram of a welding machine according to an embodiment of this application, with an electrode assembly positioning groove omitted.

In some embodiments, as shown in FIG. 9 and FIG. 10, the welding machine of this application is an ultrasonic welding machine. The welding machine may typically include structures such as a welding head 200, a welding base 210, and an electrode assembly positioning groove 300. The electrode assembly 900 is arranged in the electrode assembly positioning groove 300. The drive mechanism 30 drives the first crimping portion 21 and the second crimping portion 22 to be crimped onto the body 910 and the tab 920 of the electrode assembly 900, respectively. The welding head 200 and the welding base 210 respectively implement ultrasonic welding on the tab 920 in the vertical direction.

In conclusion, it should be noted that the technical features in the foregoing embodiments may be combined in any way. For brevity of description, not all the possible combinations of the technical features in the foregoing embodiments are described. However, as long as there is no contradiction among the combinations of these technical features, all these combinations shall be construed as being within the scope recorded in this specification.

The foregoing embodiments show merely several implementations of this application, and descriptions thereof are specific and detailed, but should not be construed as any limitation on the scope of this patent. It should be noted that those of ordinary skill in the art may further make several modifications and improvements without departing from the concept of this application, and these modifications and improvements also fall within the protection scope of this application. Therefore, the protection scope of this application should be subject to the appended claims.

What is claimed is:

1. A pressing plate structure, comprising:
a frame; and
a pressing block unit, wherein:
the pressing block unit comprises a first crimping portion and a second crimping portion fixedly connected to each other;
the first crimping portion is movably disposed on the frame in a first direction to approach or leave an electrode assembly;
the second crimping portion protrudes downward from the first crimping portion in the first direction, the second crimping portion comprising a crimping block, and a bottom surface of the crimping block facing a tab of the electrode assembly being provided with a protruding rib; and
the second crimping portion is provided with a welding hole running through the crimping block in the first direction, the protruding rib being arranged to surround the welding hole; and
the second crimping portion is capable of being crimped onto the tab, and the welding hole exposes part of the tab.

2. The pressing plate structure according to claim 1, wherein:
the first crimping portion comprises a first sub-plate, a transition section, and a second sub-plate;
the first sub-plate and the second sub-plate are respectively connected to a left side and a right side of the transition section, and the transition section is shorter than the first sub-plate, so as to form a notch; and
at least part of the second crimping portion is disposed in the notch.

3. The pressing plate structure according to claim 2, wherein:
the second crimping portion further comprises a fixing block;
the fixing block is detachably connected to the transition section; and
the crimping block is located in the notch.

4. The pressing plate structure according to claim 1, wherein:
a first shaping section is formed at a junction between a first side surface of the crimping block close to the first sub-plate and the bottom surface of the crimping block facing the tab; and/or
a second shaping section is formed at a junction between a second side surface of the crimping block close to the second sub-plate and the bottom surface of the crimping block facing the tab.

5. The pressing plate structure according to claim 1, further comprising:
a drive mechanism;
wherein the drive mechanism is fixed to the frame and is in transmission connection with the first crimping portion so as to drive the first crimping portion to movably approach or leave the electrode assembly along the first direction.

6. The pressing plate structure according to claim 5, wherein:
the pressing block unit comprises a connecting plate;
the connecting plate is connected to the drive mechanism; and
the connecting plate is connected to a surface of the first crimping portion facing away from the electrode assembly.

7. The pressing plate structure according to claim 1, wherein the first crimping portion and the second crimping portion are integrally connected.

8. A welding machine, comprising the pressing plate structure according to claim 1.

9. The welding machine according to claim 8, wherein the welding machine is an ultrasonic welding machine.

10. A pressing plate structure, comprising:

a frame; and a pressing block unit, wherein:

the pressing block unit comprises a first crimping portion and a second crimping portion fixedly connected to each other, the first crimping portion is movably disposed on the frame in a first direction to approach or leave an electrode assembly, the first crimping portion comprising a first sub-plate, a transition section, and a second sub-plate, and the first sub-plate and the second sub-plate being respectively connected to a left side and a right side of the transition section to form a notch;

the second crimping portion protrudes downward from the first crimping portion in the first direction, the second crimping portion comprising a fixing block and a crimping block, the fixing block being detachably connected to the transition section, and the crimping block being located in the notch; and the second crimping portion is provided with a welding hole extending in the first direction;

wherein:

the second crimping portion is capable of being crimped onto a tab of the electrode assembly, and the welding hole exposes part of the tab;

a first shaping section is formed at a junction between a first side surface of the crimping block and a bottom surface of the crimping block facing the tab, and/or a second shaping section is formed at a junction between a second side surface of the crimping block and the bottom surface of the crimping block facing the tab; and the first shaping section and the second shaping section are inclined surfaces or smooth arc surfaces.

* * * * *